United States Patent [19]

Buck

[11] 4,055,296
[45] Oct. 25, 1977

[54] ELECTRONIC TEMPERATURE CONTROL SYSTEM FOR THERMOSTATIC CONTROL

[76] Inventor: Robert J. Buck, 1063 Church Hill Road, Fairfield, Conn. 06430

[21] Appl. No.: 670,352

[22] Filed: Mar. 25, 1976

[51] Int. Cl.² .................... G05D 23/24; H03K 17/60
[52] U.S. Cl. ............................. 236/1 C; 307/252 F; 361/165
[58] Field of Search ............ 236/78 R, 68 B, 15 BR, 236/1 C; 307/252 T, 252 B, 252 F, 310; 219/501, 511; 165/26, 27; 323/75 H, 75 F; 328/3; 361/165

[56] References Cited

U.S. PATENT DOCUMENTS

| 3,064,103 | 11/1962 | Biermann et al. | 236/68 B X |
|---|---|---|---|
| 3,328,606 | 6/1967 | Pinckaers | 307/252 T |
| 3,372,328 | 3/1968 | Pinckaers | 307/252 T |
| 3,684,171 | 8/1972 | Evalds | 236/78 R |
| 3,783,369 | 1/1974 | Chambers | 236/78 D |
| 3,817,453 | 6/1974 | Pinckaers | 219/511 X |
| 3,861,589 | 1/1975 | Carlson | 236/68 B |

OTHER PUBLICATIONS

The D13T - A Programmable Unijunction Transistor, 11/67, W. R. Spofford, Jr., G.E. Bulletin, pp. 1, 2 & 7.

Primary Examiner—William E. Wayner
Attorney, Agent, or Firm—Alphonse R. Noe

[57] ABSTRACT

An electronic temperature control system utilizes a circuit having two main terminals for connection to a low voltage relay control system of the type generally used in residential heating or cooling systems without the need for an auxiliary source of power. The circuit includes a temperature sensing thermistor, an adjustable reference voltage control, a programmable unijunction transistor voltage threshold detector circuit, power switching thyristor means and bridge diodes. Heat anticipation is provided by thermally coupling the thyristor switching means and the temperature sensing thermistor.

11 Claims, 4 Drawing Figures

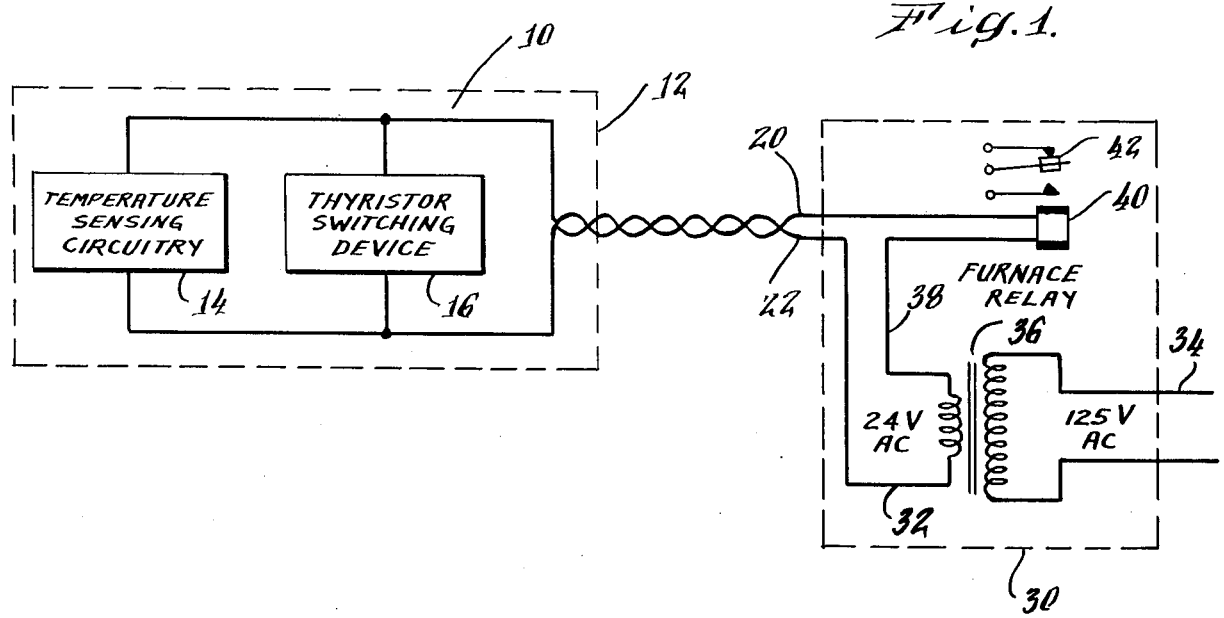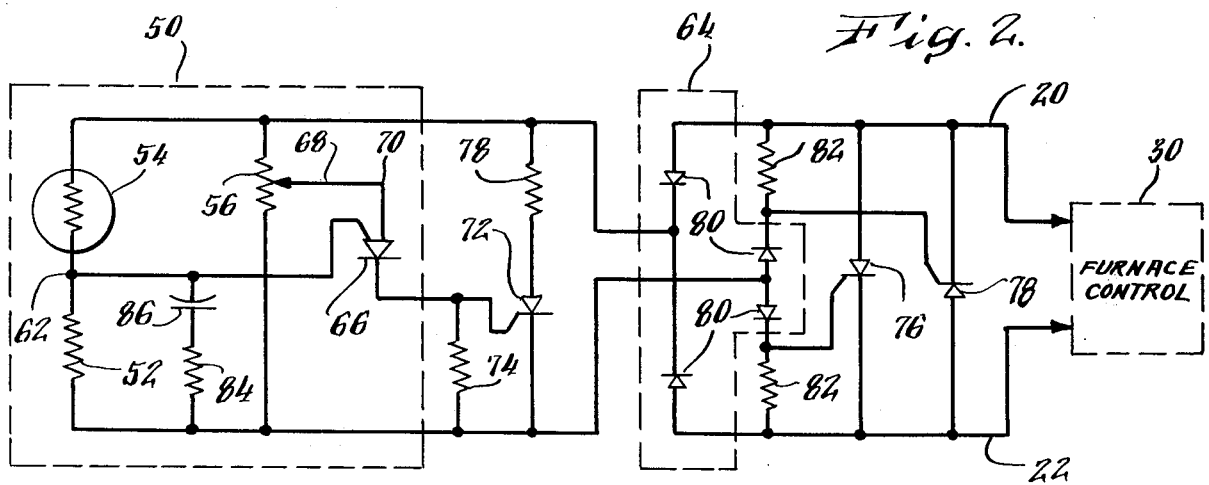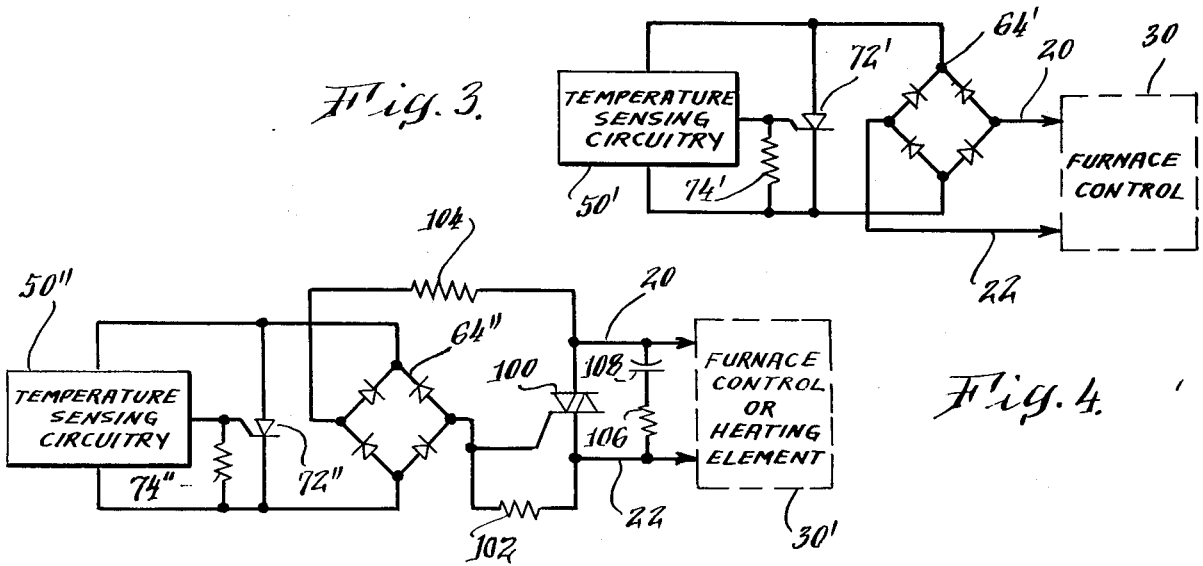

ELECTRONIC TEMPERATURE CONTROL SYSTEM FOR THERMOSTATIC CONTROL

BACKGROUND OF THE INVENTION

1. Field of the Invention

The invention relates to temperature control systems and, more particularly, to a thermostat intended to be employed in operating a standard control system of the type generally used in residential or commercial heating and/or cooling systems.

Energy shortages and high costs of fuel have made it increasingly important that heating and air conditioning systems deliver maximum comfort and efficiency for the operating expenses involved. While many suggestions for saving fuel and energy have been advanced, one of the easiest economy measures to implement involves thermostatic control of room temperature. For example, it has been demonstrated that significant fuel savings can be achieved by simply turning down the thermostat at night and many devices for obtaining such control automatically have been proposed.

Another area in which fuel savings can be attained through thermostatic control involves the comfort of individuals and the tendency of individuals to frequently adjust a thermostat during the day when their comfort deviates from that to which they are accustomed. A major cause of variable feelings of comfort is the fact that standard home thermostats of the bimetallic type are frequently responsive only over a wide fluctuation in temperature, as much as 4° F., while a narrow fluctuation, such as 1° F., can be felt by the individual.

2. Description of the Prior Art

Bimetallic element type thermostats having narrow temperature differential sensitivity are available. However, these thermostats tend to be costly in proportion to increased sensitivity while at the same time possessing the disadvantages of mechanical frailty so that they are subject to damage as a consequence of dirt, shock, vibration and the like. Thus, while bimetallic thermostats which offer narrow differential operation to reduce temperature lag and overshoot are available, they tend to be mechanically unstable and unreliable. In addition, the light contact pressure typical in such devices encourages electrical arcing and pitting, adding to the unreliability and promoting relay operated furnace malfunction.

Electronic thermostats are known to overcome some of the disadvantages associated with the bimetallic thermostats. However, prior art thermostats of an electronic nature have employed amplifiers and circuitry which require auxiliary power sources and/or specially adapted relay control mechanisms. As a consequence, component costs and installation expense are frequently too great for acceptability in a residential heating market.

For example, U.S. Pat. No. 3,861,589 (Carlson) discloses an electronic temperature control system and thermostat requiring a differential amplifier. Heat anticipation is obtained, according to the patentee, by providing a diode in contiguous heat transfer relationship with a thermistor. According to the patentee's conditions of operation, thermostat relay current is restricted to 20 mA in the "on state" so that it would not be practical for use with standard home furnace controllers. U.S. Pat. No. 3,623,545 (Pinckaers) discloses a modulating type of electronic thermostat which includes a heat anticipator in the form of a semiconductor current-carrying means that is in heat exchange relationship with the temperature sensor. That is, the patentee uses a component specifically provided and powered to generate heat to be used in anticipation applications. The relatively large amounts of current required to generate an intermediate degree of anticipation in such a device precludes its practical application in a two wire switching system, the type system found in residential applications. U.S. Pat. No. 3,419,214 (Evalds) shows an electronic temperature regulating system employing a DC relay and DC power source, which are not commonly found in the standard residential control system, and a diode compensated bridge which triggers a silicon controlled rectifier (SCR).

Thus, it can be seen that prior art attempts at providing narrow temperature control have been many and varied. These attempts provide varying degrees of success and advantages for particular applications. However, for the reasons described above, a device satisfactory for control of a low voltage relay control mechanism such as would be found on a home oil or gas fired furnace and/or air conditioning or ventilation system has not heretofore been obtained. That is, drawbacks arising from mechanical unreliability and other factors make these devices and systems unattractive to the residential consumer.

SUMMARY OF THE INVENTION

The aforementioned disadvantages are overcome according to my invention through the provision of an electronic temperature control system for thermostatic control utilizing a circuit having two main terminals, one of which is connected by a conductor to a terminal of an alternating current source provided as part of a standard low voltage furnace control mechanism and the other of which is connected by a second conductor to a terminal of an alternating current operated relay also provided as part of the standard furnace control mechanism. Accordingly, the main circuit of my invention requires no auxiliary source of alternating or direct current. Rather, current is supplied by the alternating current source provided as part of the standard furnace control mechanism thus making the electronic thermostat of my invention advantageously suitable for low cost installations in residential heating and/or cooling systems as a replacement for existing bimetallic thermostats.

The temperature control system of my invention comprises a temperature sensing thermistor, an adjustable reference voltage control, a programmable unijunction transistor voltage threshold detector circuit, power switching thyristor means and bridge diodes in a circuit having two main terminals. Thus, the use of electronic components instead of the usual mechanical bimetallic switching devices permits reliable, narrow-differential operation unaffected by shock, vibration, contact pitting or fouling. Consequently, lag and overshoot are reduced and the tendency for temperature to oscillate above and below the thermostat setting is greatly minimized. In this manner, room temperature may be maintained closer to the selected thermostat setting to permit more consistant comfort at reduced thermostat settings and the elimination of frequent adjustment to achieve individual comfort, both of which result in an increase in fuel economy. At the same time, the need for amplifiers and circuitry requiring auxiliary power sources and/or specially adapted relay control mechanisms is eliminated. Thus, an electronic thermostat for residential use having reduced component cost and installation expense is obtained.

Accordingly, a feature of my invention is provision of an electronic temperature control system for thermostatic control which can be readily installed in a standard two wire heating or cooling unit control system.

The electronic temperature control system according to my invention may make provision for minimizing temperature overshoot due to heat inertia by providing heat anticipation by thermal coupling of the thyristor switching means and the temperature sensing thermistor. Adjustment of heat anticipation in relationship to current required by the furnace control system relay is made by varying the thermal coupling between the thyristor means and the thermistor element. A thermostat according to my invention is easily utilized as either a heating system thermostat or an air conditioning thermostat or, if desired, as a combination heating-air conditioning system thermostat with selection features for operation in either mode. In either case, the thermostat is not voltage sensitive and requires only two wires for its circuit so that is is readily compatible with all conventional systems.

Therefore, a further feature of my invention is the provision of an electronic temperature control system having heat anticipation.

The aforementioned advantages and features of my invention will be more apparent from the following detailed description of preferred embodiments thereof taken in conjunction with the accompanying drawings in which:

BRIEF DESCRIPTION OF THE DRAWINGS

FIG. 1 is a schematic illustration showing a temperature control system according to my invention containing a circuit with two main terminals connected to a standard two-wire low voltage furnace-air conditioning control mechanism;

FIG. 2 is a schematic circuit diagram of an embodiment of my invention in which the temperature control system may be connected to a furnace control mechanism over which no control of load current or inductance is practically possible;

FIG. 3 is a schematic circuit diagram illustrating another embodiment of my invention in which the temperature control system circuit is advantageously designed for use with fast commutation SCR thyristors and for use in relatively low current, low inductance applications; and FIG. 4 is a schematic circuit diagram illustrating another embodiment of my invention in which the temperature control system circuit is advantageously designed for use in high voltage, low inductance applications such as in thermostatic control of electric heating elements which do not employ a relay control mechanism.

DESCRIPTION OF THE PREFERRED EMBODIMENTS

FIG. 1 schematically illustrates a temperature control system 10 in which a thermostat enclosure case 12, indicated in phantom, contains a temperature sensing circuit 14 of the type including a room temperature sensitive thermistor element and an adjustable resistance element, such as a potentiometer, for setting the desired room temperature. A power switching thyristor means 16 is controlled by the temperature sensing circuitry in order to send a signal to a heating or a cooling system to adjust the room temperature sensed to the temperature selected. The signal is sent by a conducting means which, in the standard residential system, comprises two wires 20 and 22.

FIG. 1 also shows a schematic representation of a conventional low voltage furnace control mechanism referred to generally at 30. The furnace control mechanism 30 includes a low voltage alternating current source 32 which obtains current from the standard household source 34 by the transformer means 36. The low voltage alternating current source 32 is connected by means of a conductor or conductive circuit 38 to a alternating current operated relay 40 for operating relay contact points 42. Although, for purposes of simplicity of illustration, the conductive circuit 38 is shown as a wire, in a typical furnace control mechanism additional control circuit elements may be employed. However, these do not materially affect the invention described herein.

When current passes through the relay winding to energize its core, the contact points 42 are caused to close. The contact points, in turn, constitute part of a circuit for causing the furnace to turn on and off so that the furnace is turned on when the relay 40 is energized. The conducting wires 20 and 22 which are connected to the main terminals of the temperature control system device are connected to the furnace control mechanism 30 as shown. That is, the wire 22 connects one main terminal to the one terminal of the relay 40 while the wire 22 connects the other main terminal to the low voltage alternating current source 32 to provide a complete circuit.

Referring to FIG. 2, a temperature sensing circuit 50 includes two resistor voltage divider networks. The first network is comprised of a resistor 52 and a thermistor 54. The second network is comprised of an adjustable resistance element, a potentiometer 56. The resistor voltage divider networks are connected to the positive terminal, shown at 58, of a diode bridge 64. The diode bridge negative terminal is connected to a circuit common connection, shown at 60. A DC voltage is developed between the positive and negative terminals of the diode bridge 64. The thermistor 54 is a negative temperature coefficient device, the resistance of which decreases as temperature increases. Therefore, in the embodiment of FIG. 2, the proportion of an applied DC voltage at the terminal 58, which can be measured between the circuit common connection 60 and the point 62, will increase with increasing temperature. If desired, the position of the resistor 52 and the thermistor 54 can be reversed to decrease the voltage at point 62 as temperature increases and utilize the sensing device for controlling an air conditioning system.

The point 62 is connected to the gate of a programmable unijunction transistor (PUT) 66. The anode of the PUT is connected to the wiper 68 of the potentiometer 56 at the point 70. The cathode of the PUT is connected to the gate of a silicon controlled rectifier (SCR) thyristor 72 and through a resistor 74 to the circuit common connection 60. The SCR thyristor 72 is connected to the circuit common connection 60 and diode bridge negative terminal and through a resistor 77 to the diode bridge positive terminal.

The programmable unijunction transistor (PUT) is a specially constructed thyristor which will conduct from cathode to anode only when the voltage on the anode exceeds the voltage at the gate by at least one diode forward voltage drop, approximately 0.6 volts. As in other thyristors, conduction will then continue until the voltage from anode to cathode falls below its forward junction voltage drop.

A voltage is developed at the point 62, the gate of the PUT, which is determined by the room temperature. A voltage is also developed at the point 70, the anode of the PUT, which is determined by the position of the potentiometer wiper 68 which is calibrated in relation to desired room temperature. If the room temperature is higher than that temperature for which the potentiometer has been set, the voltage at the point 62 will be too high in relation to the point 70 to permit the PUT to conduct current into the gate of the SCR thyristor 72. Should the room temperature fall below that temperature for which the potentiometer has been set, the voltage at the point 62 will fall in relation to the point 70 to trigger the PUT into conduction. Current is then supplied to the gate of the SCR thyristor 72, causing it to conduct.

A pair of main SCR thyristors 76 and 78 are connected back to back across the circuit two main terminals 20 and 22. During alternate half cycles of the alternating current, when the SCR thyristor 72 connected to the output of the bridge diodes 80 of the diode bridge 64 is properly gated, current will flow through opposite legs of the diode bridge and produce, in the resistors 82 in series with each leg of the bridge, a voltage which causes one or the other of the main SCR thyristors, 76 and 78, to be gated into conduction. Since each main SCR thyristor conducts only on alternate half cycles, the main SCR thyristors are permitted a complete half cycle to commutate. Therefore, high inductance in the load will have no affect upon circuit operation.

The main SCR thyristors 76 and 78 may or may not be high voltage and/or high current devices depending upon the use required. It can be seen that this embodiment of my invention is advantageous for use in applications when the temperature control system circuit of my invention may be connected to a furnace control mechanism over which no control of load current or inductance is possible.

At the beginning of each half cycle, the main SCR thyristors 76 and 78 and the gate SCR thyristor 72 are each in an off state. When the room temperature falls below that selected and the voltage at the point 62 falls in relation to the point 70 to that required to trigger the PUT 66 into conduction, current is supplied to the gate of the SCR thyristor 72 causing it to conduct. Gate voltage is then developed for either SCR thyristor 76 or 78, gating that thyristor to an on state. A low impedance is then presented at the main terminals 20 and 22 causing the relay (relay 40 of FIG. 1) in the furnace control mechanism (30 of FIG. 1) to operate.

Relay chatter is prevented and a sharp switchpoint with a determined hysterisis or differential is provided by connecting a resistor 84 and a capacitor 86 in series between the point 62 and the circuit common connection 60. The values of these components and, therefore, their RC time constant, is such that when the circuit of this invention is in an on condition, the capacitor 86 is allowed to be fully discharged during each half cycle. The charging current at the onset of each succeeding half cycle causes the voltage at the point 62 to be somewhat reduced. Room temperature must then rise somewhat above the thermostat setting to cause the circuit to turn off. Inversely, when the thermostat is in an off condition, the resistor/capacitor network is able to maintain its charge from half cycle to half cycle. Little if any charging current then is necessary to charge the capacitor, allowing the circuit to switch to an on condition at the calibrated thermostat setting. This differential between the turn off and turn on points of the circuit of my invention may be adjusted by varying the values of the resistor 84 or the capacitor 86 and those skilled in the art will be able to choose the values for the particular operation desired. Reliable operation can be achieved with a very small differential between the two switch points. A differential found advantageous in the embodiments of my invention intended for use with heating and/or air conditioning systems is approximately 0.25° F.

Since the voltage threshold detection accomplished by the PUT 66 is essentially a comparison of instantaneous voltages, rather than absolute voltages, the voltage of the alternating current source (such as 32 in FIG. 1) is relatively unimportant. Limitations are primarily determined by the breakdown voltages of the thyristors and diodes employed, and by the current limitation of the thermistor, and those skilled in the art will be able to select them accordingly. However, calibration of the thermostat scale will not be affected by voltage variations.

FIG. 3 illustrates an embodiment of my invention which may find advantageous utility with fast commutation SCR thyristors and for use in relatively low current, low inductance applications. Referring to FIG. 3, where elements similar to the embodiment of FIG. 2 carry like numerals, the main terminals 20 and 22 are connected to the input of a diode bridge 64'. An SCR thyristor 72' is connected across the output of the diode bridge 64'. When promptly gated, the SCR 72' will conduct during alternate half cycles of the alternating current through opposite legs of the bridge. Since the SCR thyristor 72' requires a discrete period of time to turn off after each half cycle, a diode may be placed in series with the SCR thyristor which will then turn off once the applied voltage has fallen below the forward junction drop of the four diode junctions (approximately 2.4 volts) through which current must travel during each half cycle.

Assuming a RMS source voltage of 24 volts at a 60 Hz rate, 188 microseconds at the end and beginning of each half cycle is required during which no conduction through the SCR thyristor will take place. Accordingly, the maximum period available to permit the SCR thyristor to commutate, that is, to switch from an on to an off state, is 376 microseconds. The period required by a particular SCR thyristor to commutate is determined by its own gate characteristics and the inductance of the load, as will be recognized by those skilled in the art.

FIG. 4 shows an embodiment of my invention which finds advantageous application for high voltage, low inductance operation such as thermostat control of heating elements which do not employ a relay control mechanism, for example, line voltage resistance type electric heating elements. Referring to FIG. 4, a high current and/or high voltage TRIAC thyristor 100 is connected across the two main terminals 20 and 22. The diode bridge 64" is connected to supply the gate of the TRIAC thyristor 100 with a gate current through limiting resistors 102 and 104 when the SCR thyristor 72" is properly gated. In order to promote commutation of the TRIAC thyristor 100, a resistor-capacitor snubber circuit containing a resistor 106 and a capacitor 108 is employed between the terminals 20 and 22. High inductance in the load will prevent proper commutation, as in the embodiment of FIG. 3, and therefore this embodiment finds most advantageous utility in high voltage, low inductance applications.

Heat anticipation can be provided in the embodiments described above by thermal coupling of the thyristor switching device or devices and the thermistor 54 to obtain thermal feedback from the switching thyristor to the temperature, and hence heat, sensitive thermistor. That is, the thermistor becomes artificially heated by the thyristor in response to current flow through the thyristor causing the thermostat to turn off somewhat in advance of the actual room temperature reaching the thermostat setting and minimize temperature overshoot. Adjustment of heat anticipation in relationship to current required by the control system relay is achieved by adjustably varying the thermal coupling between the thyristors and the temperature sensing thermistor to allow for variations in current through the thyristor caused by various loads or variations in circuit voltage.

In its simplest aspect, for example, as a residential heating system thermostat, the circuit of this invention presents a relatively high circuit impedance when the room temperature is above that selected by the thermostat setting. Under these conditions, only a small fraction of the current required to operate the furnace control system relay is allowed to flow through the relay coil. When the room temperature falls below the setting of the thermostat, the circuit switches to a low impedance, which is essentially a short circuit, allowing full current to flow through the relay coil operating the relay. The invention provides for use as an air conditioning thermostat simply by configuring the circuit in such a way as to reverse the operation as a residential heating system thermostat, as will be understood by those skilled in the art. Furthermore, a combination heating/air conditioning system thermostat can be provided by including in the circuit a switch to select either operation for use in heating or in air conditioning.

I claim:

1. A temperature control system for thermostatic control of a standard two-wire voltage relay control mechanism without the presence of amplifiers and circuitry requiring a power source other than the low voltage relay control mechanism and the calibration of which is unaffected by relay voltage variations comprising a circuit having two main terminals, one terminal being adapted for connection to terminal of an alternating current operated relay of the low voltage heating and/or cooling system relay control mechanism, the circuit comprising a temperature sensing circuit including a temperature responsive thermistor and potentiometer adjustable in response to a desired temperature setting, a programmable unijunction transistor (PUT) the gate of which is connected to the thermistor and the anode of which is connected to the potentiometer wiper, a diode bridge connected across the system circuit main terminals and to the temperature sensing circuit and a SCR thyristor connected across the output of the diode bridge and to the cathode of the programmable unijunction transistor to conduct current during alternate half cycles of the alternating current through opposite legs of the bridge.

2. A temperature control system as claimed in claim 1 further including a diode in series with the SCR thyristor.

3. A temperature control system as claimed in claim 1 further including a resistor and a capacitor connected in series between the thermistor and the negative terminal of the diode bridge to provide capacitive feedback whereby relay chatter is reduced and sharp switching with a determined hysterisis or differential at a calibrated switch point may be obtained.

4. A temperature control system as claimed in claim 3 wherein the resistor and capacitor components are selectable to adjust the degree of hysteresis or differential.

5. A temperature control system as claimed in claim 1 further including a pair of SCR thyristors connected back-to-back across the system circuit main terminals.

6. A temperature control system as claimed in claim 5 further including a resistor and a capacitor connected in series between the thermistor and the negative terminal of the diode bridge to provide capacitive feedback whereby relay chatter is reduced and sharp switching with a determined hysterisis or differential at a calibrated switch point may be obtained.

7. A temperature control system as claimed in claim 6 wherein the resistor and capacitor components are selectable to adjust the degree of hysteresis or differential.

8. A temperature control system as claimed in claim 1 further including a TRIAC thyristor connected across the system circuit main terminals to receive gate current from the diode bridge when the SCR thyristor is gated.

9. A temperature control system as claimed in claim 1 further including a resistor-capacitor circuit between the system circuit main terminals to promote commutation of the TRIAC thyristor.

10. A temperature control system for thermostatic control of electrical systems including those having high voltage, low inductance characteristics of operation such as line voltage resistance-type heating elements comprising a circuit having two main terminals adapted for connection to the terminals of the electrical system being thermostatically controlled, the circuit comprising a temperature sensing circuit including a temperature responsive thermistor, a potentiometer adjustable in response to a desired temperature setting, and a programmable unijunction transistor (PUT) the gate of which is connected to the thermistor and the anode of which is connected to the potentiometer wiper, a diode bridge connected through current limiting resistors to the system circuit main terminals and to the temperature sensing circuit, a SCR thyristor connected across the output of the diode bridge and to the cathode of the programmable unijunction transistor, and a TRIAC thyristor connected across the system circuit main terminals to receive gate current from the diode bridge when the SCR thyristor is gated.

11. A temperature control system as claimed in claim 10 further including a resistor-capacitor circuit between the system circuit main terminals to promote commutation of the TRIAC thyristor.

* * * * *